United States Patent
Sugihara et al.

(10) Patent No.: US 6,754,964 B2
(45) Date of Patent: Jun. 29, 2004

(54) MOWING HEAD USED FOR MOWER

(75) Inventors: Hideo Sugihara, Gifu-ken (JP);
Hajime Tomita, Gifu-ken (JP)

(73) Assignee: DiaTop Corporation (JP)

( * ) Notice: Subject to any disclaimer, the term of this patent is extended or adjusted under 35 U.S.C. 154(b) by 56 days.

(21) Appl. No.: 10/113,908

(22) Filed: Mar. 29, 2002

(65) Prior Publication Data

US 2002/0170183 A1 Nov. 21, 2002

(30) Foreign Application Priority Data

Apr. 2, 2001 (JP) ........................................ 2001-103768

(51) Int. Cl.[7] .......................................... A01D 34/416
(52) U.S. Cl. ....................................................... 30/276
(58) Field of Search ...................... 30/276, 347; 56/127, 56/295

(56) References Cited

U.S. PATENT DOCUMENTS

| 4,236,311 A | * | 12/1980 | Mitchell ....................... 30/276 |
| 4,274,201 A | * | 6/1981 | Oberg et al. .................. 30/276 |
| 4,349,962 A | * | 9/1982 | Itagaki et al. ................. 30/276 |
| 4,490,910 A | * | 1/1985 | Mattson et al. ............... 30/276 |
| 4,524,515 A | | 6/1985 | Oberg .......................... 30/276 |
| 4,584,771 A | | 4/1986 | Tillotson ...................... 30/276 |
| 4,817,288 A | | 4/1989 | Hirose et al. ................. 30/276 |
| 4,823,465 A | * | 4/1989 | Collins ......................... 30/276 |
| 4,942,664 A | * | 7/1990 | Zatulovsky .................. 30/276 |
| 6,131,922 A | * | 10/2000 | Klukos .................... 280/11.206 |
| 6,454,521 B1 | * | 9/2002 | Anderson et al. .......... 415/55.1 |

FOREIGN PATENT DOCUMENTS

| JP | 63-079522 | 4/1988 |
| JP | 3-69249 | 10/1991 |
| JP | 2955096 | 7/1999 |

\* cited by examiner

Primary Examiner—Hwei-Siu Payer
(74) Attorney, Agent, or Firm—Madson & Metcalf

(57) ABSTRACT

A mowing head includes a case, which is detachably attached to a rotary shaft located at a distal end of a manipulating rod of a mower, and a weed cutting tool, which is attached to the case. The bottom portion of the case is formed of resin. A protecting member is arranged in the bottom portion and insert molded using a material having an anti-wear resistance characteristic that is superior to that of the resin.

12 Claims, 12 Drawing Sheets

MOWING HEAD USED FOR MOWER

BACKGROUND OF THE INVENTION

The present invention relates to a mowing head used for a mower, which rotates a cutter to cut weed.

Generally, a cutter cord type mowing head includes a case, which is detachably connected to a rotary shaft of a motor installed at a distal end of a manipulating rod, and a reel, which is accommodated in the case with a cutter cord wound thereabout. A manipulating member is movably received in a center hole of the reel. A coil-like spring constantly urges the manipulating member to project downward from the case. Further, a phase angle changing mechanism is provided to change the pivotal phase angle of the reel with respect to the case in cooperation with the centrifugal force of the cutter cord when the manipulating member is hit against the ground.

When the mower using the conventional cutter cord is used for a long time, the distal end of the cutter cord wears out. Thus, during weed cutting, the manipulating member is hit against the ground or the manipulating member is manually manipulated after stopping the rotation of the cutter. As a result, the phase angle changing mechanism, which is located between the case and the reel, relatively rotates the reel with respect to the reel by a predetermined angle. This rewinds the cutter cord and adjusts the length of the cutter cord.

Conventionally, the following has been proposed as the structure of the manipulating member.

(1) Mold the entire manipulating member from synthetic resin.
(2) Form an opening is formed in the bottom potion of the manipulating member, which is formed of synthetic resin, fit a metal protecting member in the opening, insert a bolt, which is connected to the protecting member, in the opening, and fasten the protecting member to the manipulating member with a nut (refer to U.S. Pat. No. 4,524,515).

However, the prior art example (1) has a shortcoming in that due to contact between the manipulating member and the ground and repeated hitting of the bottom portion of the manipulating member against the ground during weed cutting, the bottom portion of the manipulating member wears out and becomes damaged at a relatively early stage.

If the bottom portion of the manipulating member wears out at an early stage, the entire component must be replaced even though its other functions are normal. This is not economic. Further, this increases wear and dispersion of the resin forming the bottom portion of the manipulating member and pollutes the environment.

Additionally, the spring that urges the manipulating member downward contacts the top surface on the bottom portion of the manipulating member. This has a shortcoming in that the movement between the top surface on the bottom portion of the manipulating member and the spring causes wear.

Prior art example (2) solves the above problem regarding wear of the manipulating member. However, the repeated hitting of the manipulating member loosens the spring. In this case, the protecting member may fall off or fall apart. Further, a spring receiving seat, which is located on the bottom portion of the manipulating member, wears out. Thus, there is a shortcoming in that it is burdensome and difficult to install the protecting member.

It is an object of the present invention to provide a mowing head used in a mower that suppresses wear of a manipulating member, reduces the number of the parts to facilitate manufacturing and assembly, and prevents a protecting member from falling off or falling apart.

In addition to the above object, a further object of the present invention is to provide a mowing head used in a mower that suppresses wear of a spring receiving seat.

SUMMARY OF THE INVENTION

To achieve the above objects, a perspective of the present invention provides a mowing head used in a mower. The mowing head includes a case detachably attached to a rotary shaft, which is located at a distal end of a manipulating rod of the mower, and a weed cutting tool, which is attached to the case. A bottom portion of the case is formed of resin. A protecting member is arranged in the bottom portion and insert molded using a material having an anti-wear resistance characteristic that is superior to that of the resin.

DETAILED DESCRIPTION OF THE PREFERRED EMBODIMENTS

A mowing head used in a mower according to a first embodiment of the present invention will now be described with reference to FIGS. 1 to 9.

Figure 1:
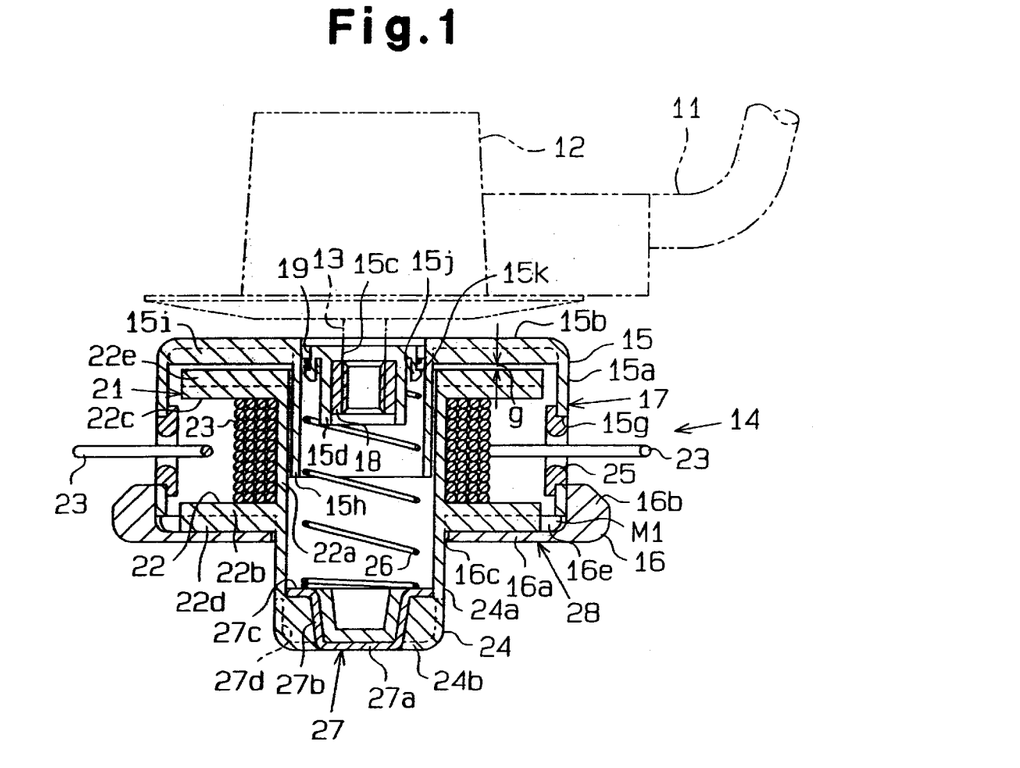
FIG. 1 is a cross-sectional view showing a mowing head according to a first embodiment of the present invention.
Figure 2:
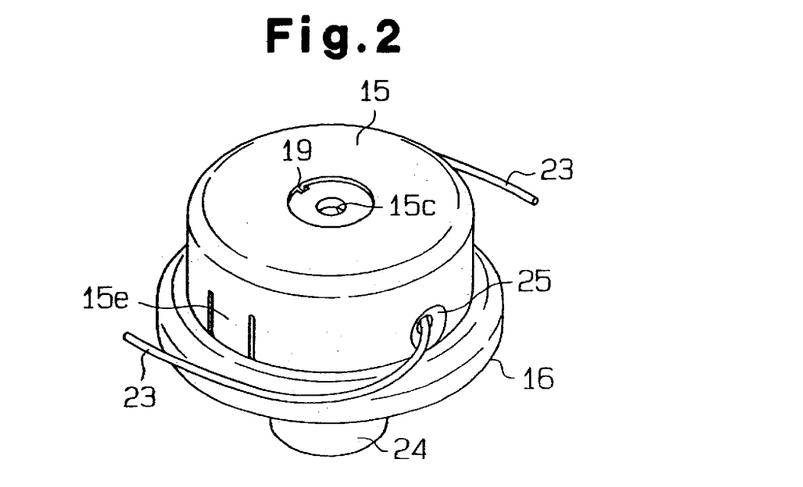
FIG. 2 is a perspective view showing the mowing head of the first embodiment.

With reference to FIG. 1, a motor 12 is fixed to a distal end of a manipulating rod 11 of the mower in a state facing downward. A mowing head 14 is detachably attached to a rotary shaft 13 of the motor 12.

A synthetic resin body case 15, which forms the mowing head 14, has the form of a closed cylinder that includes a cylindrical portion 15a and a top plate 15b, which is formed integrally with an upper end of the cylindrical portion 15a. A lower opening of the body case 15 is closed by a synthetic resin cover plate 16, such as 6 nylon or 66 nylon. The body case 15 and the cover plate 16 form a case 17.

A through hole 15c, through which the rotary shaft 13 extends, is formed in the middle of the top plate 15b of the body case 15. A nut 18 is fitted to an accommodating cylinder 15d, which is formed integrally with a lower surface of the top plate 15b around the through hole 15c. The rotary shaft 13 is engaged with the nut 18.

Figure 3:
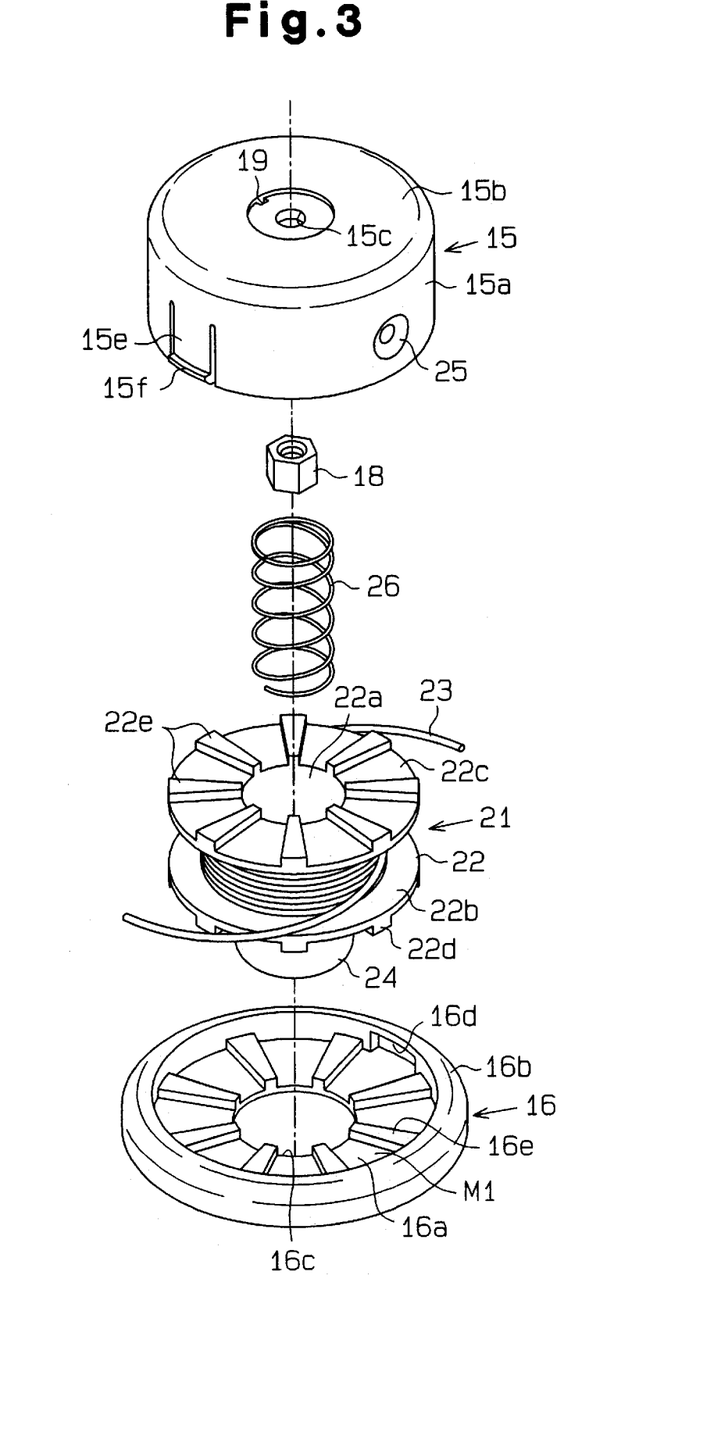
FIG. 3 is an exploded perspective view showing a body case, a reel, and a cover plate of the first embodiment.
Figure 4:
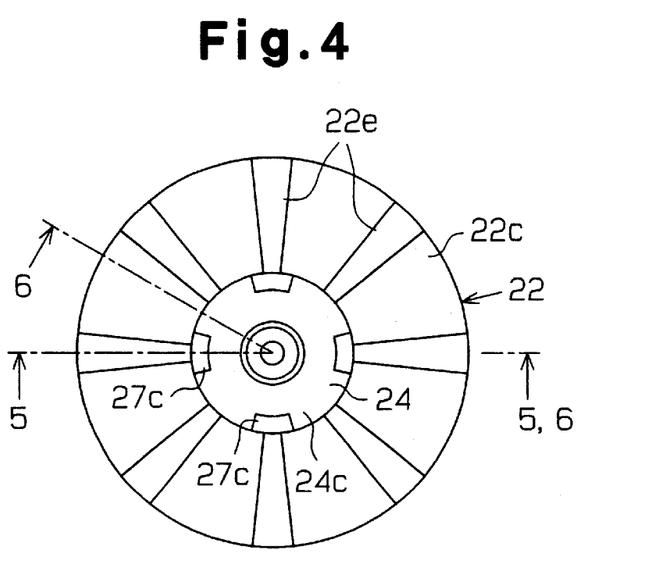
FIG. 4 is a plan view showing a bobbin of the first embodiment.

With reference to FIG. 3, engaging pieces 15e are cut at two positions (only one is shown) into the peripheral surface of the cylindrical portion 15a of the case 15. An engaging portion 15f is formed at a lower outer end of each of the engaging pieces 15e. The cover plate 16 includes a flat plate portion 16a and a flange 16b, which is formed integrally with the periphery of the flat plate portion 16a. A hole 16c extends through the center of the flat plate portion 16a. Engaging recesses 16d, with which the engaging portions 15f of the body case 15 are engaged, are formed in the inner surface of the flange 16b. After the body case 15 is attached to the rotary shaft 13, the cover plate 16 is fitted to a lower peripheral portion of the cylindrical portion 15a in the body case 15. This causes the flange 16b to press the engaging portions 15f, thus elastically deforming the engaging pieces 15e. The engaging portions 15f are thus engaged with the engaging recesses 16d.

The case 17 accommodates a reel 21. A bobbin 22, which forms the reel 21, includes a cylindrical portion 22a, a lower flange 22b, and an upper flange 22c. The cylindrical portion 22a is pivotally fitted to the outer surface of a shaft cylinder 15h, which is formed integrally with the lower side of the top plate 15b of the body case 15 and coaxially with the accommodating cylinder 15d. The lower flange 22b is formed integrally with a lower end of the cylindrical portion 22a. The upper flange 22c is formed integrally with an upper end of the cylindrical portion 22a. Two cutter cords 23 are wound around the bobbin 22. The distal ends of the cutter cords 23 each extend outward through a cap 25, which is fitted to a hole 15g formed in the cylindrical portion 15a of the body case 15.

A manipulating member 24, which forms a ground hitting member, is formed integrally with a lower end of the cylindrical portion 22a of the bobbin 22. The manipulating member 24 projects downward from the hole 16c, which is formed in the flat plate portion 16a of the cover plate 16. The manipulating member 24 has the form of a closed cylinder and includes a cylindrical portion 24a and a bottom portion 24b, which is formed integrally with a lower side of the cylindrical portion 24a. A coil-like spring 26, which constantly urges the bobbin 22 and the manipulating member 24 downward, is located between the lower surface of the top plate 15b of the body case 15 and the upper surface of the bottom portion 24b of the manipulating member 24. The upper surface of the bottom portion 24b forms a spring receiving seat 24c for the spring 26.

Figure 8:
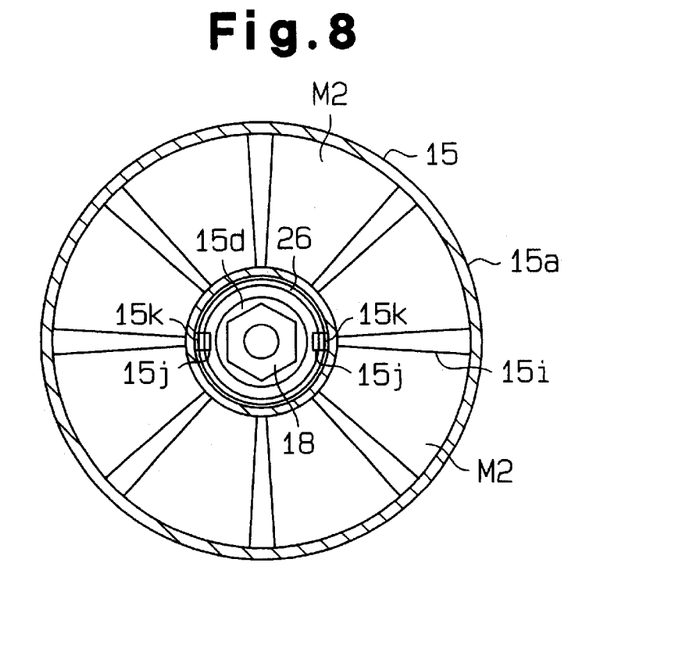
FIG. 8 is a bottom view showing the body case.
Figure 9:
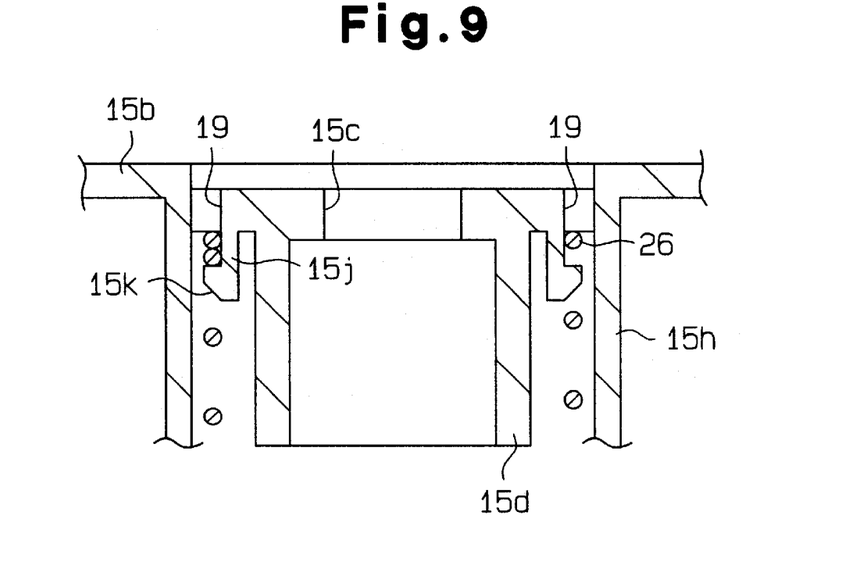
FIG. 9 is an enlarged cross-sectional view showing an engaging piece and an engaging portion.

With reference to FIGS. 1, 8, and 9, a pair of engaging pieces 15j and a pair of engaging portions 15k are located at the lower side of the top plate 15b between the accommodating cylinder 15d and the shaft cylinder 15h. An upper annular portion of the spring 26 is engaged with the engaging pieces 15j and the engaging portions 15k. Holes 19, which are used to form the outer surfaces of the engaging pieces 15j and the inner surfaces of the engaging portions 15k, are formed in the top plate 15b at positions corresponding to the engaging pieces 15j. To engage the upper annular portion of the spring 26 with the engaging portions 15k, the upper annular portion is pressed against lower slanted surfaces of the engaging portions 15k from below. This elastically deforms the engaging pieces 15j such that the upper annular portion moves beyond the engaging portions 15k. The upper annular portion of the spring 26 is thus secured at a predetermined position. This prevents the spring 26 from falling off.

Figure 5:
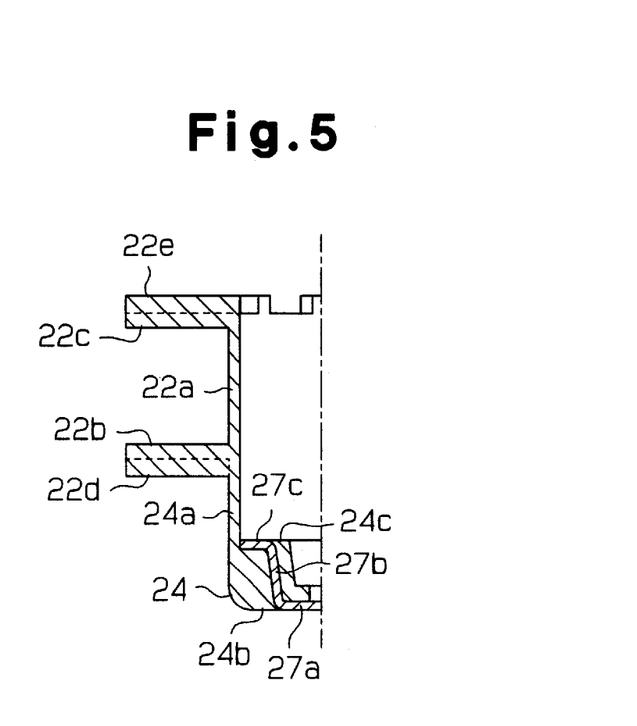
FIG. 5 is a cross-sectional view taken along line 5—5 of FIG. 4.
Figure 6:
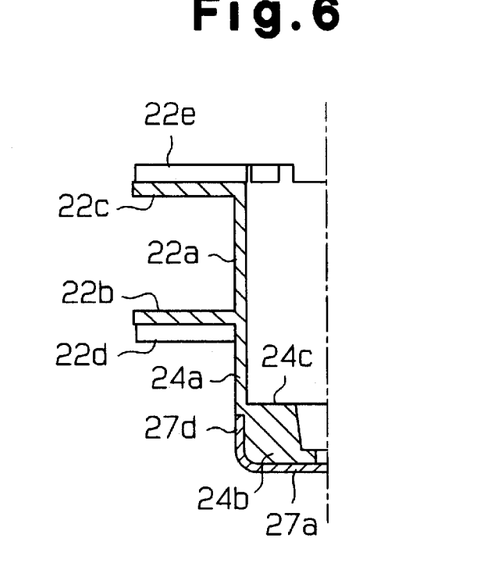
FIG. 6 is a cross-sectional view taken along line 6—6 of FIG. 4.
Figure 7A:
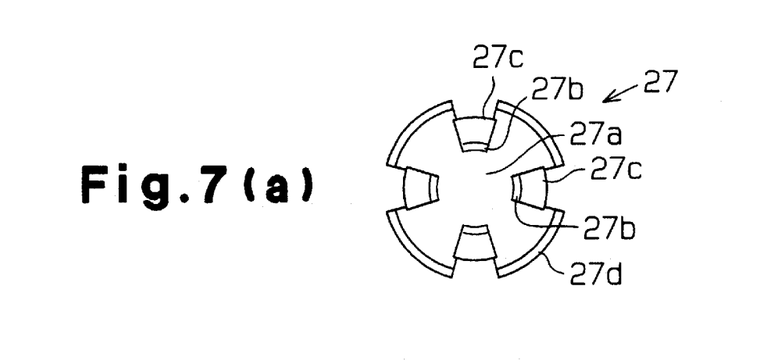
FIG. 7(a) is a plan view showing a protecting member of the first embodiment.
Figure 7B:
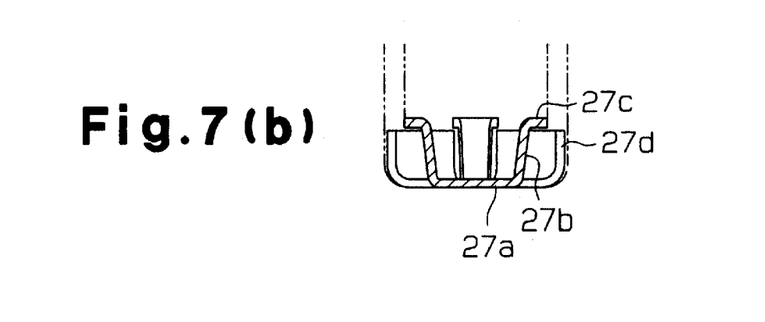
FIG. 7(b) is a cross-sectional view showing the protecting member.

When the bobbin 22 and the manipulating member 24 are injection molded, a protecting member 27, which is formed of metal, such as stainless steel, is insert molded in the bottom portion 24b of the manipulating member 24. With reference to FIGS. 5 to 7, the protecting member 27 includes a plate-like protecting plate portion 27a, which is exposed from the bottom portion 24b of the manipulating member 24 to the exterior for suppressing wear of the manipulating member 24. Further, the protecting member 27 includes lifted pieces 27b and spring receiving pieces 27c. The lifted pieces 27b are cut and lifted from a plurality of portions of the periphery of the protecting plate portion 27a. The spring receiving pieces 27c are bent outward from upper ends of the lifted pieces 27b and are exposed from the upper surface of the bottom portion 24b, or the spring receiving seat 24c. The protecting member 27 also includes side cover pieces 27d, which are bent upward at positions between the lifted pieces 27b and are exposed from the outer surface of the bottom portion 24b.

A phase angle changing mechanism, which is located between the case 17 and the bobbin 22 for changing the relative pivotal phase of the bobbin 22 with respect to the case 17 about the rotational axis of the rotary shaft 13, will hereafter be explained.

The bobbin 22 is accommodated in the case 17 such that the bobbin 22 is allowed to reciprocate with a predetermined stroke in an axial direction of the rotary shaft 13. With reference to FIG. 3, engaging projections 16e are formed radially and integrally with the upper surface of the flat plate portion 16a of the cover plate 16 at a plurality of (e.g., eight) positions. Lower engaging projections 22d are formed radially and integrally with the lower surface of the lower flange 22b of the bobbin 22 at a plurality of (e.g., eight) positions, such that the lower engaging projections 22d are engaged with engaging grooves M1, which are formed between engaging projections 16e.

Upper engaging projections 22e are formed radially and integrally with the upper surface of the upper flange 22c of the bobbin 22 at a plurality of (e.g., eight) positions, such that the upper engaging projections 22e are located at the same phase as that of the lower engaging projections 22d in a circumferential direction about the axis of the rotary shaft 13. In association with the upper engaging projections 22e, engaging projections 15i are formed integrally with the lower side of the top plate 15b of the body case 15 at a plurality of (e.g., eight) radial positions. The upper engaging projections 22e are engaged with engaging grooves M2, which are formed between engaging projections 15i. The engaging projections 15i of the body case 15 are located at a phase offset from that of the engaging projections 16e of the cover plate 16 with respect to the axis of the rotary shaft 13.

With reference to FIG. 1, when the spring 26 urges the bobbin 22 downward and the lower engaging projections 22d are secured between the engaging projections 16e, a small gap g is formed between the upper engaging projections 22e of the bobbin 22 and the engaging projections 15i of the body case 15. The widths of the engaging projections 15i, 16e, 22d, and 22e are less than the widths of the engaging grooves M1, M2.

In this embodiment, the engaging projections 15i of the body case 15, the engaging projections 16e of the cover plate 16, the lower engaging projections 22d and the upper engaging projections 22e of the bobbin 22, the manipulating member 24, the spring 26, and the engaging grooves M1, M2 form a phase angle changing mechanism 28, which changes the pivotal phase angle of the reel 21 relative to the case 17.

The operation of the mowing head 14 of the mower, which is formed as described above, will now be discussed.

With reference to FIG. 1, when the motor 12 is actuated with the cutter cords 23 extended out through the caps 25 of the mowing head 14, the rotary shaft 13 is rotated to rotate the mowing head 14. This causes centrifugal force to act to extend the cutter cords 23 in the radial direction of the case 17 so that the cutter cords 23 cut weed.

When the distal ends of the cutter cords 23 are worn out and shortened due to weed cutting over a long period of time, the cutter cords 23 must be further drawn from the reel 21. Thus, when the mowing head 14 is rotating, the operator moves the manipulating rod 11 downward to hit the manipulating member 24 of the mowing head 14 against the ground. This causes the bobbin 22 and the manipulating member 24 to move relatively upward in the case 17 against the urging force of the spring 26. The lower engaging projections 22d are thus disengaged from the engaging grooves M1, and the upper engaging projections 22e of the bobbin 22 are engaged with the engaging grooves M2.

The centrifugal force of the cutter cords 23 acts to cause relative pivoting of the upper engaging projections 22e in the engaging grooves M2. More specifically, although the case 17 and the bobbin 22 of the mowing head 14 are both rotating, the centrifugal force generated by rotation of the cutter cords 23, which are connected to the bobbin 22, causes the rotational speed of the bobbin 22 to be lower than the rotational speed of the case 17. This results in the above relative pivoting. Afterwards, when the hitting of the manipulating member 24 is stopped, the recovered urging force of the spring 26 acts to move the bobbin 22 and the manipulating member 24 to relatively downward to the case 17. The upper engaging projections 22e are thus disengaged from the engaging grooves M2. This, in turn, engages the lower engaging projections 22d of the bobbin 22 with the engaging grooves M1 that are located adjacent to the engaging grooves M1 with which the lower engaging projections 22d have originally been engaged. The centrifugal force of the cutter cords 23 then acts to cause relative pivoting of the lower engaging projections 22d in the engaging grooves M2. This rewinds the cutter cords 23 through the caps 25 by a small amount such that the cutter cords 23 are adjusted to appropriate lengths.

The advantages of the mowing head 14, which is formed as described above, will now be discussed.

(1) In the above embodiment, the protecting member 27 is integrated in the bottom portion 24b of the manipulating member 24 through insert molding such that the protecting plate portion 27a is exposed to the exterior. This suppresses wear of the manipulating member 24 and prevents the protecting member 27 from falling off or falling apart. Further, the number of the parts decreases, and manufacturing and assembly of the mowing head 14 are facilitated.

(2) In the above embodiment, the spring receiving pieces 27c of the protecting member 27 are exposed from the spring receiving seat 24c to support the spring 26. This suppresses wear of the spring receiving seat 24c.

(3) In the above embodiment, the protecting member 27 includes the protecting plate portion 27a, the lifted pieces 27b, the spring receiving pieces 27c, and the side cover pieces 27d. The protecting plate portion 27a is exposed from the outer side of the bottom portion 24b of the manipulating member 24. The lifted pieces 27b are cut to project from a plurality of portions of the periphery of the protecting plate portion 27a. The spring receiving pieces 27c are bent outward from the upper ends of the lifted pieces 27b and are exposed from the upper side of the bottom portion 24b. The side cover pieces 27d are bent upward between lifted pieces 27b. The entire protecting member 27 is thus easily fabricated by pressing a metal plate. Further, the weight of the protecting member 27 is reduced, and the mowing head 14 is rotated smoothly.

(4) In the above embodiment, the engaging pieces 15j and the engaging portions 15k, with which the upper end of the spring 26 is engaged, are located at the lower side of the top plate 15b. Thus, when the cover plate 16 and the reel 21 are separated from the body case 15, the spring 26 is prevented from falling off from the body case 15. This facilitates the replacement of the cutter cords 24 without having to worry about losing the spring 26.

A mower according to a second embodiment of the present invention will now be described with reference to FIGS. 10 to 15. In the second embodiment, parts having the same structure and function as the first embodiment are denoted with the same reference numeral and will not be described below.

Figure 10:
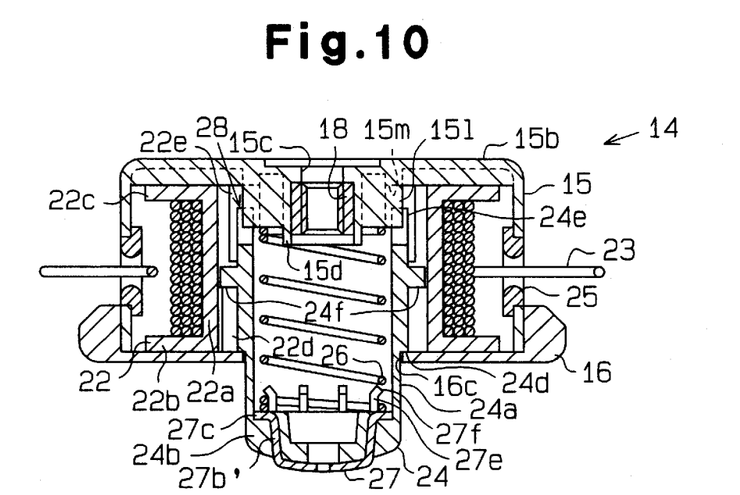
FIG. 10 is a cross-sectional view showing a mowing head according to a second embodiment of the present invention.
Figure 11:
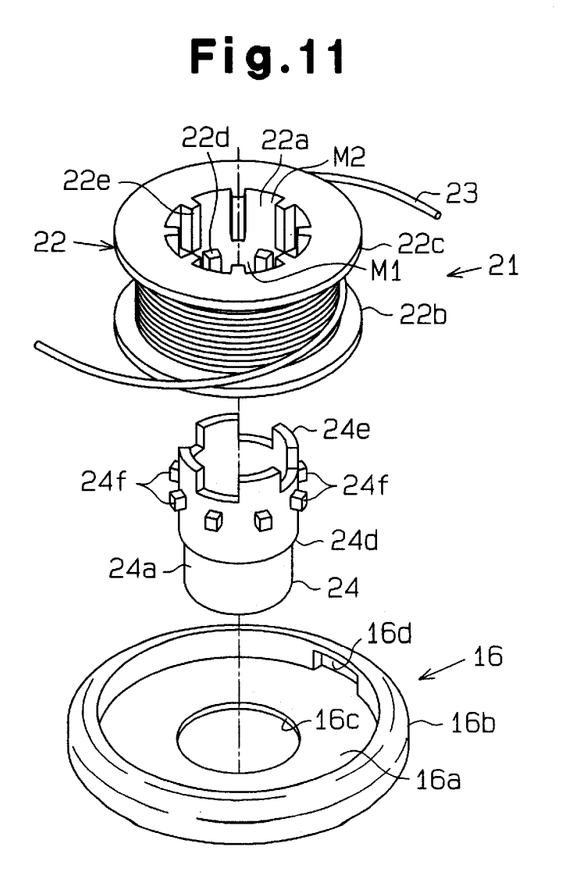
FIG. 11 is an exploded perspective view showing a bobbin, a manipulating member, and a cover plate of the second embodiment.
Figure 12:
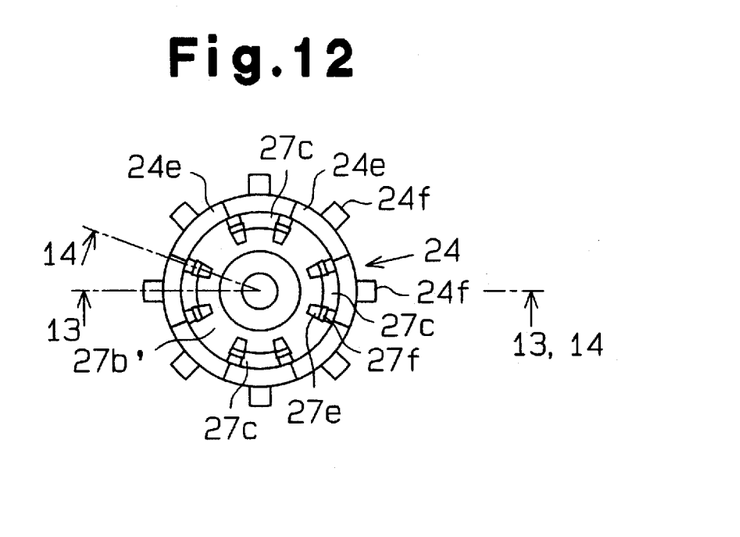
FIG. 12 is a plan view showing the manipulating member and a protecting member of the second embodiment.
Figure 13:
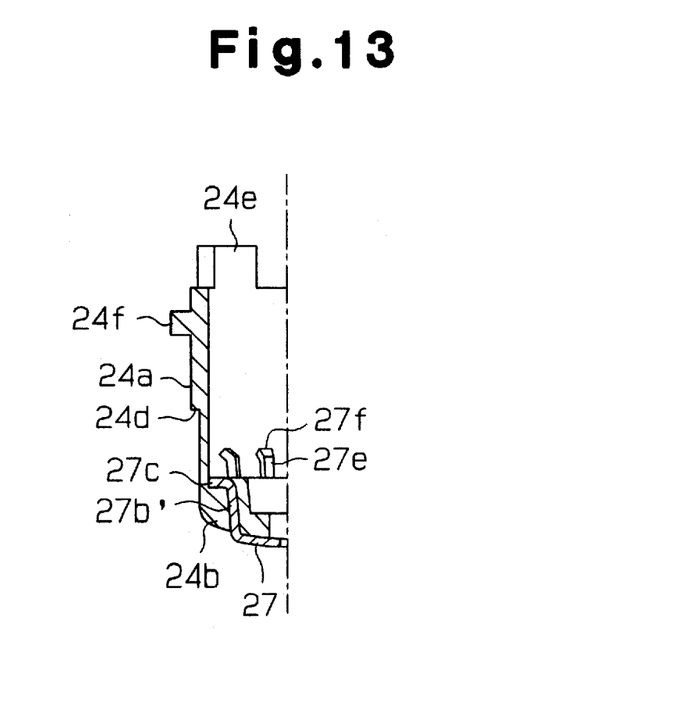
FIG. 13 is a cross-sectional view taken along line 13—13 of FIG. 12.
Figure 14:
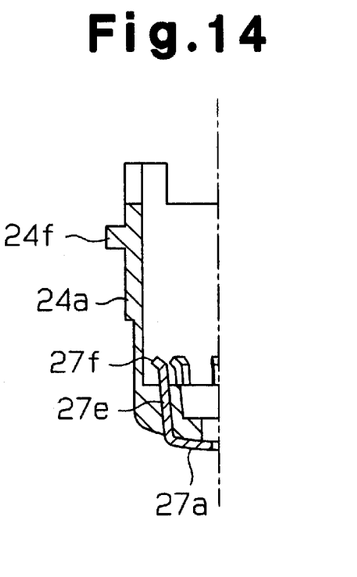
FIG. 14 is a cross-sectional view taken along line 14—14 of FIG. 12.

In the second embodiment, the body case 15 accommodates the bobbin 22 such that the bobbin 22 is allowed to pivot relative to the body case 15 but is prohibited from moving axially relative to the body case 15. The bobbin 22 and the manipulating member 24 are formed separately from each other. An annular step 24d is formed at an intermediate outer peripheral portion of the cylindrical portion 24a of the manipulating member 24. The step 24d restricts the maximum projecting length of the manipulating member 24 from the hole 16c. Engaging projections 24e are cut to project from an upper end of the cylindrical portion 24a at a plurality of (for example, four) positions.

A boss 151, which forms a spring receiving seat for receiving the upper end of the spring 26, is formed integrally with the lower side of the top plate 15b of the body case 15. Engaging recesses 15m are formed in the boss 151. The engaging projections 24e of the manipulating member 24 are engaged with the engaging recesses 15m, such that the engaging projections 24e are allowed to move in an axial direction of the manipulating member 24 but are prohibited from pivoting relative to the engaging recesses 15m.

Engaging projections 24f project from the outer periphery of the cylindrical portion 24a of the manipulating member 24 at a plurality of (for example, eight) positions. Further, the lower engaging projections 22d and the upper engaging projections 22e, which extend axially and parallel with one another, are formed integrally with the inner side of the cylindrical portion 22a of the bobbin 22. The engaging grooves M1, M2 are formed between adjacent lower engaging projections 22d.

The protecting member 27, which is inserted in the bottom portion 24b of the manipulating member 24, is formed as shown in FIGS. 12 to 15. In other words, the protecting member 27 includes the protecting plate portion 27a, a cylindrical portion 27b', which is formed on the periphery of the protecting plate portion 27a, and the spring receiving pieces 27c. The spring receiving pieces 27c are bent sideward from an upper end of the cylindrical portion 27b' and are exposed from the upper side of the bottom portion 24b. Further, the protecting member 27 includes engaging pieces 27e and engaging portions 27f, which are bent between adjacent spring receiving pieces 27c and are engaged with the spring 26.

In the second embodiment, when the manipulating member 24 is hit against the ground during rotation of the mowing head 14 of FIG. 10, the manipulating member 24 is moved upward relative to the body case 15. The engaging projections 24f are thus disengaged from the engaging grooves M1 and are received by the engaging grooves M2. When the hitting of the manipulating member 24 is stopped, the engaging projections 24f are returned from the engaging grooves M2 to the engaging grooves M1. During this stage, the bobbin 22 is pivoted relative to the body case 15 such that the cutter cords 23 are drawn out through the caps 25 by a predetermined length.

In the second embodiment, the protecting member 27 includes the engaging pieces 27e and the engaging portions 27f. Thus, when the manipulating member 24 is removed from the body case 15, the spring 26 is prevented from being separated from the manipulating member 24. It is thus possible to easily replace the cutter cords 23. Other effects of the second embodiment are the same as those of the first embodiment.

The above embodiment may be modified as described below.

Figures 16A, 16B:
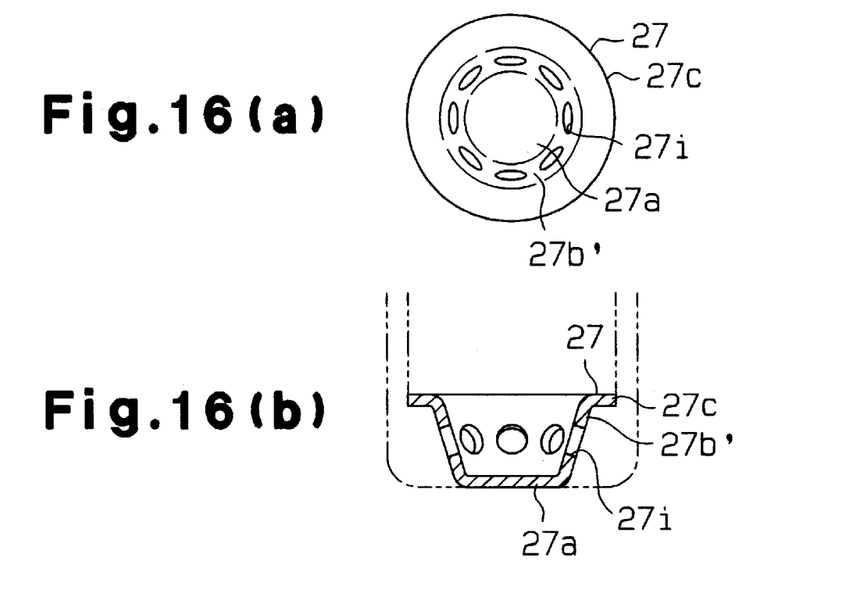
FIG. 16(a) is a plan view showing a further embodiment of the protecting member.
FIG. 16(b) is a cross-sectional view showing the protecting member.

In a further embodiment shown in FIGS. 16(a) and 16(b), the cylindrical portion 27b' includes through holes 27i. In this embodiment, the through holes 27i connect the resin forming the bottom portion 24b in the interior of the cylindrical portion 27b' to the resin forming the bottom portion 24b at the exterior of the cylindrical portion 27b'. This increases the strength bonding the bottom portion 24b and the protecting member 27.

Figures 17A, 17B:
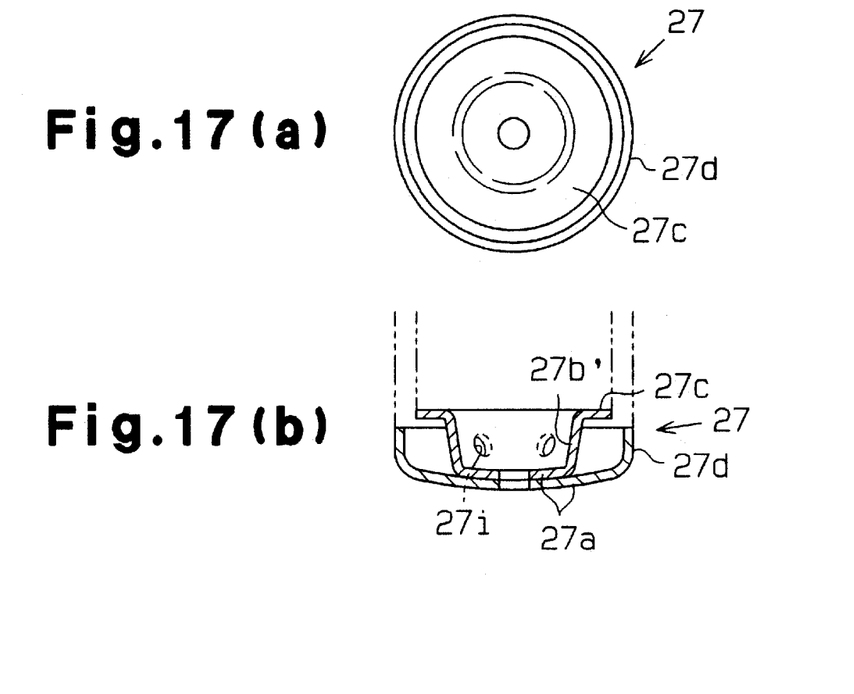
FIG. 17(a) is a plan view showing a further embodiment of the protecting member.
FIG. 17(b) is a cross-sectional view showing the protecting member.
Figure 18:
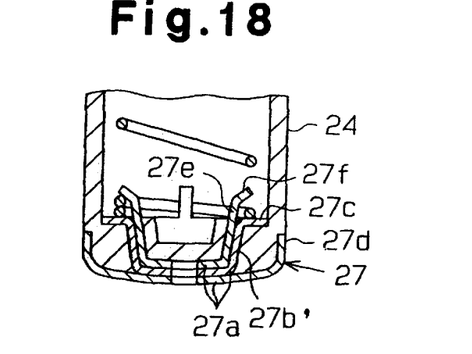
FIG. 18 is a cross-sectional view showing a further embodiment of the manipulating member and a further embodiment of the protecting member.
Figure 19:
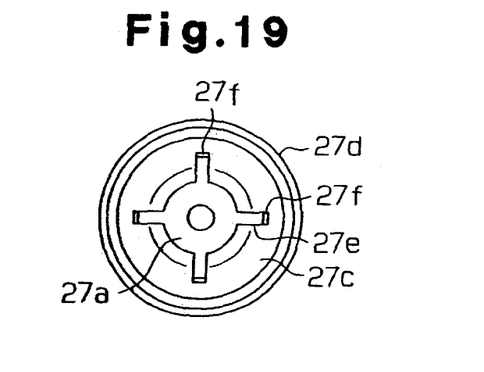
FIG. 19 is a plan view showing the protecting member of FIG. 18.

In a further embodiment shown in FIGS. 17(a) and 17(b), the protecting member 27 includes two elements that are joined together in a stacked manner. A first element includes a protecting plate portion 27a and a side cover piece 27d, which is bent upward from the outer periphery of the protecting plate portion 27a. A second element includes a protecting plate portion 27a, a cylindrical portion 27b', which is bent upward from the periphery of the protecting plate portion 27a, and a spring receiving piece 27c, which is bent outward from the upper end of the cylindrical portion 27b'. In the further embodiment of FIGS. 17(a) and 17(b), an upper section of the cylindrical portion 27b' and the spring receiving piece 27c are inserted in the bottom portion 24b of the manipulating member 24. Further, the interior defined by the side cover piece 27d is hollow.

In a further embodiment shown in FIGS. 18, 19, 20(a), 20(b), and 20(c), the protecting member 27 includes three elements that are joined together in a stacked manner. A first element includes a protecting plate portion 27a and a side cover piece 27d, which is bent upward from the outer periphery of the protecting plate portion 27a. A second element includes a protecting plate portion 27a, a cylindrical portion 27b', which is bent upward from the outer periphery of the protecting plate portion 27a, and a spring receiving piece 27c, which is bent outward from the upper end of the cylindrical portion 27b'. A third element includes a protecting plate portion 27a, engaging pieces 27e, which are bent upward from a plurality of portions of the outer periphery of the protecting plate portion 27a, and engaging portions 27f, which are formed at the upper ends of the engaging pieces 27e.

Figure 21:
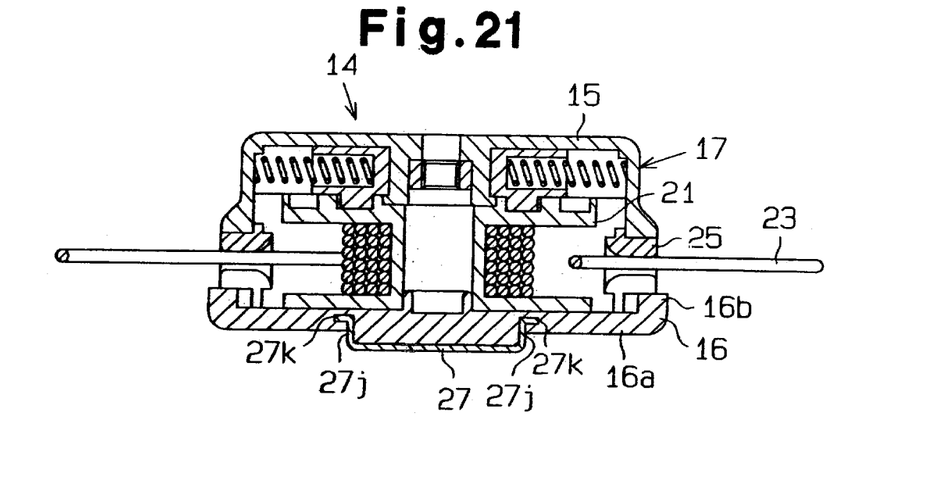
FIG. 21 is a longitudinal cross-sectional view showing a further embodiment.
Figure 22:
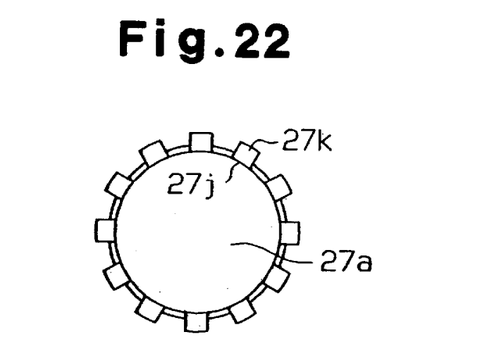
FIG. 22 is a plan view showing the protecting member of FIG. 21.

A further embodiment shown in FIGS. 21 and 22 is the mowing head 14 that includes an unwinding mechanism, which automatically unwinds the cutter cords 23 when the lengths of the cutter cords 23 are insufficient. The manipulating member 24 is omitted, and the protecting member 27 is inserted in the cover plate 16. In the protecting member 27, lifted pieces 27j are bent to project from plural positions of the periphery of the protecting plate portion 27a. Stopping pieces 27k are bent outward from the upper ends of the lifted pieces 27j. The principle of the automatic unwinding mechanism of the cutter cords 23 has been disclosed in Japanese Laid-Open Patent Publication No. 63-07952 and is thus known.

Figure 23:
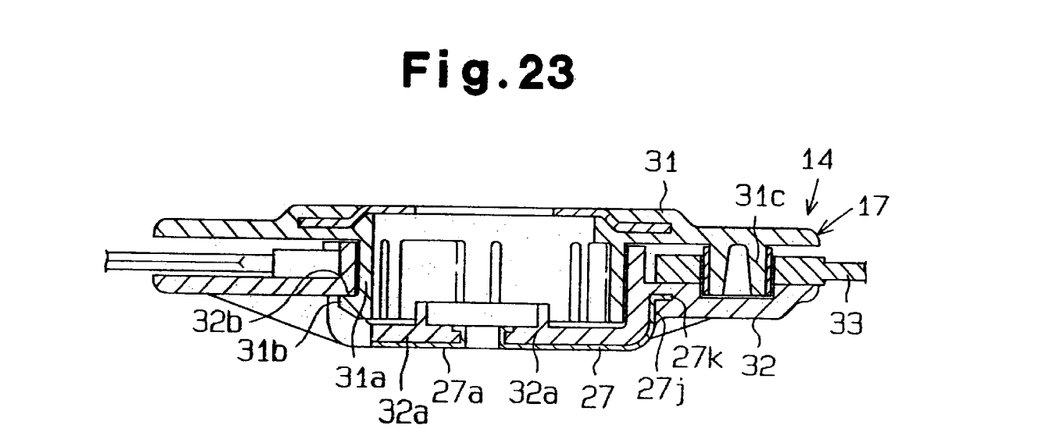
FIG. 23 is a longitudinal cross-sectional view showing a further embodiment.
Figure 24:
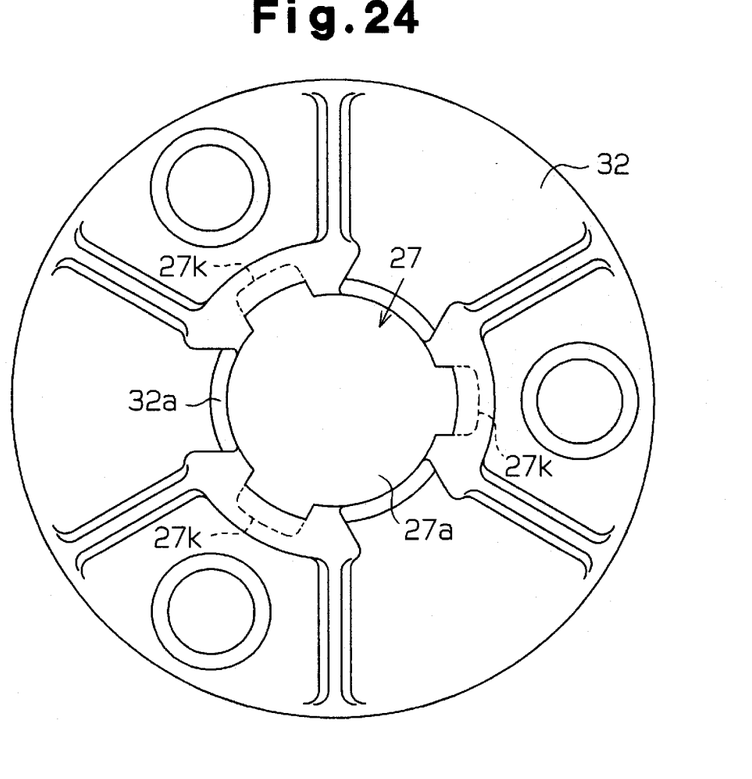
FIG. 24 is a bottom view showing a lower case of FIG. 23.

A mowing head according to a further embodiment of the present invention that does not use the cutter cords 23 is shown in FIGS. 23 and 24. A lower case 32 is detachably engaged with an upper case 31. In this embodiment, the upper case 31 and the lower case 32 form the mowing head 14. A ground contact portion 32a extends from the middle of the lower case 32. The protecting plate portion 27a of the protecting member 27 covers an outer surface of the ground contact portion 32a. An engaging piece 31a is formed integrally with a lower side of the upper case 31. An engaging portion 31b is formed at the distal end of the engaging piece 31a. Engagement of the engaging portion 31b with an engaging step 32b formed in the lower case 32 connects the lower case 32 with the upper case 31. A shaft portion 31c is formed integrally with the lower side of the upper case 31. A cutter blade 33 is connected to the shaft portion 31c such that the cutter blade 33 is pivotal within a predetermined angular range.

Figures 25A, 25B:
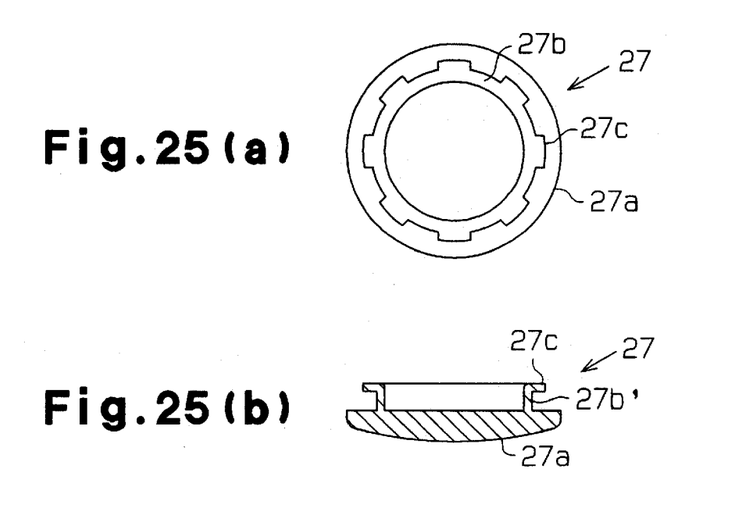
FIG. 25(a) is a plan view showing a further embodiment of the protecting member.
FIG. 25(b) is a cross-sectional view showing the protecting member.

In a further embodiment shown in FIGS. 25(a) and 25(b), the protecting member 27 is cast or forged from metal. The protecting member 27 may also be formed by sintering powdered metal or ceramic. Alternatively, the protecting member 27 may be formed by cutting a metal material.

The protecting member 27 does not have to have a flat circular form and may have a polygonal form, such as a triangular, square, pentagonal, hexagonal, or octagonal form.

The mowing head 14 may be installed in a mower in which an engine is attached to the proximal end of the manipulating rod 11. The rotation of the engine is transmitted to the rotary shaft 13, which is located at the distal end of the manipulating rod 11.

In addition to metals having anti-wear resistance that is higher than that of synthetic resin, the protecting member 27 may be made of ceramics. The engaging pieces 15j and the engaging portions 15k may be formed of metal, and the engaging pieces 15j and the engaging portions 15k may be insert molded in the body case 15 when the body case 15 is molded.

Although not illustrated in the drawings, the present invention may be embodied in a bottom portion of a case of a mowing head having a structure in which the manipulating member 24 is formed in the case 17 and does not project to the exterior (see, for example, Japanese Examined Patent Publication No 3-69249).

Although not illustrated in the drawings, the present invention may be embodied in a bottom portion of a case of a mowing head having a structure in which the reel 21 does not rotate relative to the case 17 but the caps 25 rotate relative to the case 17 (see, for example, Japanese Patent No. 2955096).

In this specification, the insert molding includes the following structure.

The structure in which the bottom portion 24b of the cylindrical portion 24a of the manipulating member 24 is formed entirely by the protecting member 27 and is joined with the cylindrical portion 24a through insert molding.

Figures 15A, 15B:
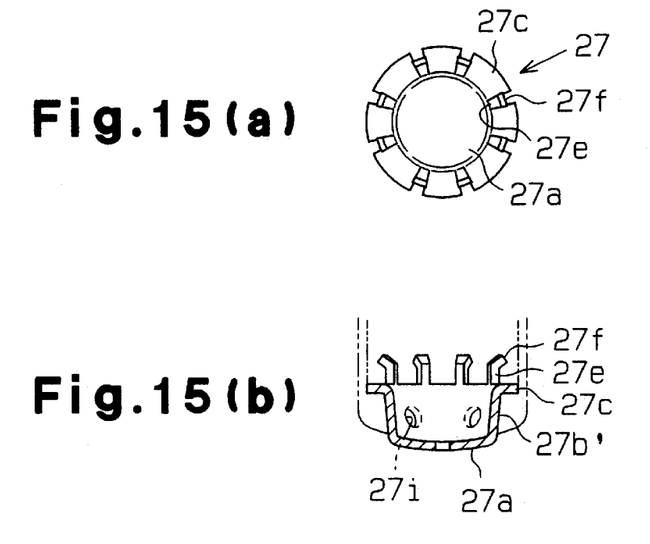
FIG. 15(a) is a plan view showing the protecting member of the second embodiment.
FIG. 15(b) is a cross-sectional view showing the protecting member.
Figure 20A:
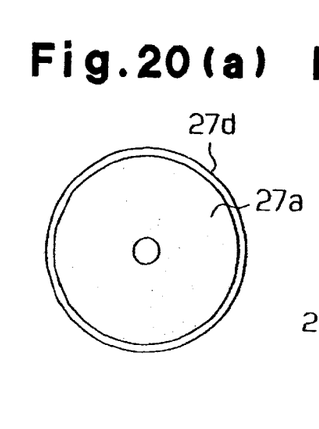
FIGS. 20(a), 20(b), and 20(c) are plan views showing three components of the protecting member of FIG. 18.
Figure 20B:
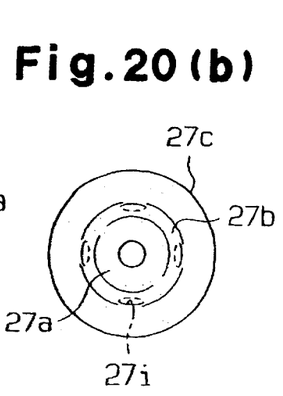
Figure 20C:
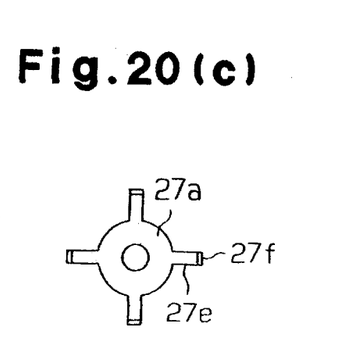

The through holes 27i, which are shown in FIGS. 16(a) and 16(b), may also be formed in the cylindrical portions 27b' of other embodiments, as indicated in FIGS. 15(b), 17(b), and 20(b).

What is claimed is:

1. A mowing head of mower, wherein the mower includes a case detachably attached to a rotary shaft, which is located at a distal end of a manipulating rod of the mower, and a weed cutting tool, which is attached to the case, the mowing head comprising:
   a bottom portion of the case formed of resin;
   a protecting member, wherein the protecting member is arranged in the bottom portion and insert molded using a material having an anti-wear resistance characteristic that is superior to that of the resin;
   a reel accommodated in the case to wind a cutter cord that functions as the weed cutting tool;
   a manipulating member arranged at a central portion of the reel to rewind the cutter cord by pivoting the reel relative to the case by a predetermined angle;
   an urging means for constantly urging the manipulating member in a direction projecting the manipulating member from the case; and
   a phase angle changing mechanism, which changes a pivotal phase angle of the reel relative to the case through manipulation of the manipulating member;
   wherein the manipulating member is formed of resin, and the protecting member formed of superior anti-wear resistant material is insert molded in the bottom portion of the manipulating member;
   wherein a receiving seat, which extends to an upper surface of the bottom portion to support the urging means, is formed in the protecting member.

2. The mowing head of a mower according to claim 1, wherein the urging means is a coil spring.

3. The mowing head of a mower according to claim 2, wherein engaging pieces, which extend through the bottom portion and projects upward from the bottom portion, and engaging portions, which are engaged with the spring, are formed in the protecting member.

4. The mowing head of a mower according to claim 2, wherein the protecting member includes:
   a protecting plate portion, which is exposed from an outer surface of the bottom portion of the manipulating member;
   lifted portions, which are cut and lifted from a plurality of locations at the periphery of the protecting plate portion;
   spring receiving pieces, which are bent outward from upper ends of the lifted portions and are exposed from an upper surface of the bottom portion; and
   side cover pieces, which are bent upward between the lifted portions and are exposed from a peripheral surface of the bottom portion.

5. The mowing head of a mower according to claim 2, wherein the protecting member includes:
   a protecting plate portion, which is exposed from an outer surface of the bottom portion of the manipulating member;
   a cylindrical portion, which is formed on the periphery of the protecting plate portion;
   spring receiving pieces, which are bent sideward from an upper end of the cylindrical portion and are exposed from an upper surface of the bottom portion; and
   engaging pieces and engaging portions, which are bent between the spring receiving pieces, wherein the engaging pieces and the engaging portions are engaged with the spring.

6. The mowing head of a mower according to claim 5, wherein a through hole, which is filled with a resin that forms the bottom portion, is formed in the cylindrical portion, and the resin in the through hole connects the resin located in the interior of the cylindrical portion to the resin located at the exterior of the cylindrical portion.

7. The mowing head of a mower according to claim 2, wherein:
   the protecting member includes two elements that are connected to each other in a stacked manner, a first one of the elements including a first protecting plate portion and a side cover piece bent upward from the periphery of the first protecting plate portion; and
   a second one of the elements including a second protecting plate portion, a cylindrical portion bent upward from the periphery of the second protecting plate portion, and a spring receiving piece bent outward from an upper end of the cylindrical portion.

8. The mowing head of a mower according to claim 7, wherein a through hole, which is filled with a resin that forms the bottom portion, is formed in the cylindrical portion, and the resin in the through hole connects the resin located in the interior of the cylindrical portion to the resin located at the exterior of the cylindrical portion.

9. The mowing head of a mower according to claim 2, wherein:
   the protecting member includes three elements that are connected to each other in a stacked manner, a first one of the elements includes a first protecting plate portion and a side cover piece bent upward from the periphery of the first protecting plate portion;
   a second one of the elements includes a second protecting plate portion, a cylindrical portion bent upward from the periphery of the second protecting plate portion, and a spring receiving piece bent outward from an upper end of the cylindrical portion; and a third one of the elements includes a third protecting plate portion, engaging pieces, which are bent upward from a plurality of portions of the periphery of the third protecting plate portion to engage the spring, and engaging portions formed at upper ends of the engaging pieces.

10. The mowing head of a mower according to claim 9, wherein a through hole, which is filled with a resin that forms the bottom portion, is formed in the cylindrical portion, and the resin in the through hole connects the resin located in the interior of the cylindrical portion to the resin located at the exterior of the cylindrical portion.

11. The mowing head of a mower according to claim 1, wherein the protecting member is formed by press-molding a metal plate.

12. The mowing head of a mower according to claim 1, wherein the protecting member is formed of one of metal and ceramic.

* * * * *